US010760917B2

(12) United States Patent
Moore et al.

(10) Patent No.: US 10,760,917 B2
(45) Date of Patent: Sep. 1, 2020

(54) DYNAMIC DISPLAY OF ROUTE PREVIEW INFORMATION

(71) Applicant: Uber Technologies, Inc., San Francisco, CA (US)

(72) Inventors: Christopher Moore, San Francisco, CA (US); Evelyn Kim, San Rafael, CA (US); Christine Misuye Tao, Mountain View, CA (US); Nadeem Malik, New York, NY (US); Paweena Attayadmawittaya, Oakland, CA (US); Christopher Haugli, San Francisco, CA (US); Jayant B. Sai, Santa Clara, CA (US); Christopher Michael Sanchez, San Francisco, CA (US); Cady Wachsman, San Francisco, CA (US); Janice J Suh, Brooklyn, NY (US)

(73) Assignee: Uber Technologies, Inc., San Francisco, CA (US)

( * ) Notice: Subject to any disclaimer, the term of this patent is extended or adjusted under 35 U.S.C. 154(b) by 131 days.

(21) Appl. No.: 15/906,986

(22) Filed: Feb. 27, 2018

(65) Prior Publication Data
US 2018/0245937 A1    Aug. 30, 2018

Related U.S. Application Data

(60) Provisional application No. 62/464,310, filed on Feb. 27, 2017.

(51) Int. Cl.
*G01C 21/34* (2006.01)
*G06Q 50/30* (2012.01)

(52) U.S. Cl.
CPC ..... *G01C 21/3461* (2013.01); *G01C 21/3415* (2013.01); *G01C 21/3438* (2013.01); *G01C 21/3453* (2013.01); *G01C 21/3492* (2013.01); *G06Q 50/30* (2013.01)

(58) Field of Classification Search
CPC .................. G01C 21/3461; G01C 21/3438
See application file for complete search history.

(56) References Cited

U.S. PATENT DOCUMENTS

| | | | |
|---|---|---|---|
| 9,581,461 B1 * | 2/2017 | Chintakindi | ............ H04W 4/44 |
| 2006/0025923 A1 | 2/2006 | Dotan et al. | |
| 2006/0241854 A1 | 10/2006 | Tu et al. | |

(Continued)

OTHER PUBLICATIONS

PCT International Search Report and Written Opinion, PCT Application No. PCT/IB2018/051249, dated Jun. 26, 2018, 14 pages.

(Continued)

*Primary Examiner* — Anne Marie Antonucci
*Assistant Examiner* — Abdalla A Khaled
(74) *Attorney, Agent, or Firm* — Fenwick & West LLP (57) ABSTRACT

A transportation management system matches drivers with riders. After a rider has been picked up by a driver, a navigation route from the rider's pickup location to the driver's next stop is displayed to the driver on a mobile computing device. Prior to picking up the rider, only an initial portion of the navigation route is displayed to the driver. The amount of the initial portion displayed to the driver is dynamically determined according to its navigational complexity.

20 Claims, 6 Drawing Sheets

(56) References Cited

U.S. PATENT DOCUMENTS

| | | |
|---|---|---|
| 2009/0176508 A1 | 7/2009 | Lubeck et al. |
| 2010/0241349 A1 | 9/2010 | Wu |
| 2010/0268450 A1 | 10/2010 | Evanitsky |
| 2012/0032974 A1* | 2/2012 | Lynch .................. G01C 21/367 345/619 |
| 2012/0232943 A1 | 9/2012 | Myr |
| 2013/0322702 A1* | 12/2013 | Piemonte .............. G06T 15/005 382/113 |

OTHER PUBLICATIONS

IP Australia, Examination Report No. 1, AU Patent Application No. 2018223364, Jun. 16, 2020, nine pages.

* cited by examiner

DYNAMIC DISPLAY OF ROUTE PREVIEW INFORMATION

CROSS REFERENCE TO RELATED APPLICATIONS

This application claims the benefit of U.S. Provisional Application No. 62/464,310 filed Feb. 27, 2017 which is incorporated here by reference.

BACKGROUND

Field

The described embodiments relate generally to providing route guidance to a driver, and more particularly, to dynamically determining an initial portion of a navigation route to display to a driver, based on the navigational complexity of the initial portion.

Description of Related Art

In certain instances, it is not desirable to reveal a full navigation route to a driver, even though such a route has already been determined. For example, in a transportation management system environment in which drivers provide trips to riders, exposing a rider's destination to a driver prior to the time at which the driver picks up the rider can encourage drivers to discriminate among the riders they pick up—based on the rider's destination, estimation of trip length, etc.

Transportation management systems therefore may expose a rider's destination to a driver only once the rider has been picked up and the trip has commenced.

DETAILED DESCRIPTION

In a transportation management system, providers of ride services—which we refer to as drivers—are matched with users who request rides—which we refer to as riders. Revealing a rider's destination to a driver only once the rider has been picked up can act as a deterrent against rider shopping—that is, it prevents behavior in which drivers only pick up riders that have destinations that the drivers desire. For example, in an environment in which drivers receive payment based on the length of a trip, if ride requestors' destinations were shown at request time, drivers would tend to only pick up riders who have requested trips to farther destinations.

By not revealing the rider's destination or any routing information until after the rider has been picked up, this driver behavior can be avoided. However, a consequence of not providing destination information to the driver prior to rider pickup is that the driver is unable to plan in advance for any routing maneuvers that might be required early on in the trip. For example, if the driver picks up the rider outside of an apartment building on the east side of a north-south street, and the navigation route (e.g. vehicle navigation route) to the rider's next stop requires an immediate turn to the west, by the time the navigation route is revealed it may be difficult or impossible for the driver to position herself to make the turn. Had the driver known in advance about the upcoming left turn, she may have chosen to stop earlier on the block to make the pickup, thus allowing her to safely make the left turn in due course once the pickup was completed.

Another example consequence of not providing destination information to the driver prior to rider pickup is that the driver may ignore the provided pre-pickup navigation route if the navigation route to the pickup location appears to be inefficient. This can be an unsatisfactory consequence in a number of cases because the transportation management system can provide routing instructions that are efficient for the complete trip, not just the pre-pickup portion. For instance, the navigation route may loop around a block so that the driver picks up the rider in a direction pointing towards the destination or that avoids certain congestion points after pickup. In such cases, the pre-pickup portion may appear to be an inefficient navigation route to the pickup location but is however an efficient navigation route for the trip. Without knowing anything about the post-pickup portion of the trip, the driver may ignore the provided navigation route and instead drive along a navigation route that the driver believes is more efficient but is unknowingly inefficient for the complete trip. Had the driver known in advance about a portion of the post-pickup navigation route, the driver may have appreciated the advantage of the provided navigation route and followed it. In this way, example embodiments disclosed herein improve the trip experience for the driver and the rider.

The described embodiments enable a solution in which an initial portion of a navigation route is revealed to a driver prior to arrival at a rider's pickup location. The amount of the navigation route that is revealed is determined dynamically, in part based on the complexity of the initial portion of the navigation route.

In example embodiments, a number of alternative maneuvers can be revealed to the driver. For example, an initial segment of a navigation route can be displayed with an indication of a first maneuver and an alternative maneuver (e.g., turn left at the first intersection or alternatively go straight at the first intersection). The traffic management system can provide an alternative maneuver in cases where the first maneuver has a complexity above a predetermined maneuvering threshold and/or impacts the efficiency of the navigation route (e.g., measured at least in part by the estimated time of arrival) by less than a predetermined threshold. Providing alternative maneuvers may facilitate a more stress-free experience for the driver or allow the driver to make informed decisions when real-time traffic conditions make the first maneuver difficult or dangerous.

Figure 1:
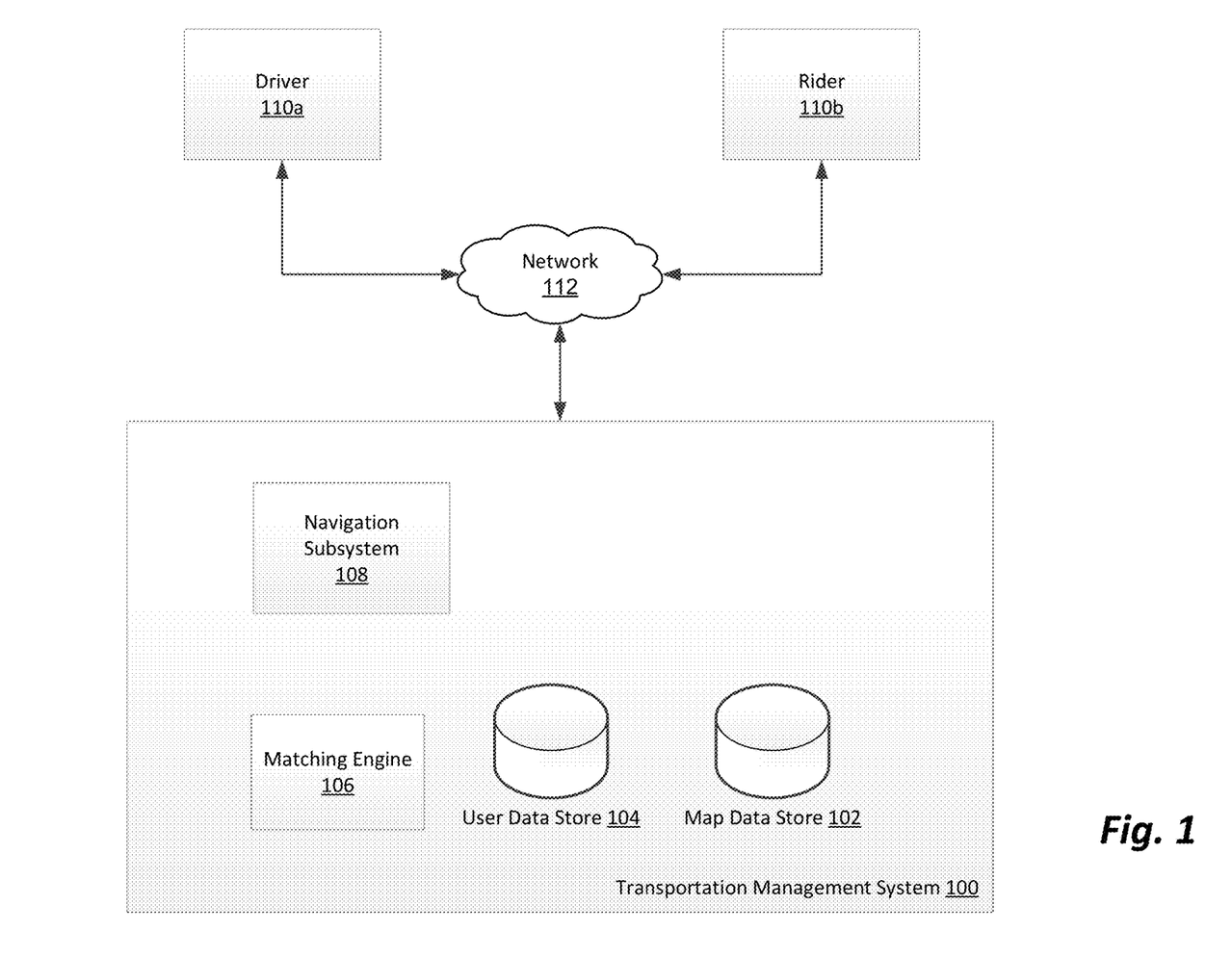
FIG. 1 illustrates a transportation management system for providing route guidance including a dynamically determined limited preview to a driver in accordance with one embodiment.

FIG. 1 illustrates a transportation management system 100 for providing route guidance including a dynamically determined limited preview to a driver in accordance with one embodiment. System 100 includes map data store 102, user data store 104, a matching engine 106, and navigation subsystem 108. FIG. 1 also illustrates a driver device 110a, a rider device 110b, and network 112. In other embodiments, the transportation management system 100 may include additional, fewer, or different components for various applications. Conventional components such as network interfaces, security functions, load balancers, failover servers, management and network operations consoles, and the like are not shown so as to not obscure the details of the system architecture.

In some embodiments, users such as drivers and riders use their client devices 110a and 110b, respectively, or more generally 110, to register with the transportation management system 100, for example, by creating accounts and providing user information (e.g., contact information, a home or office address, or billing information) to transportation management system 100. System 100 can store the user information and trip records in the user data store 104, for instance including information for trip records describing trips that a rider received from drivers, or trips that a driver provided to riders. System 100 can associate feedback received from a user or data from trips taken with the user's registered account.

Matching engine 106 selects drivers to service ride requests received from riders. For example, matching engine 106 receives a ride request from a rider device 110b and determines a set of candidate drivers that are online, available to transport a rider, and near the requested pickup location for the rider. Matching engine 106 selects a driver from the set of candidate drivers to which it transmits an assignment request. The driver can be selected based on factors such as the driver's location, the pickup and/or destination location, a type of the driver, and/or an amount of time the driver has been waiting for an assignment request, among other factors. Some factors may be weighted more than others when selecting the driver. For example, driver location may be a greater factor than driver type, or vice versa, depending upon the embodiment or the preferences of the implementer.

In some embodiments, the matching engine 106 selects the driver who is closest to the pickup location or who will take the least amount of time to travel to the pickup location (e.g., having the shortest estimated travel time to the pickup location based on routing and map information from a data source). Other factors may be considered as well depending upon the embodiment, for example, whether or not a driver's vehicle has enough available seats for multiple riders in the requesting user's party. The matching engine 106 sends an assignment request to the selected driver. If the driver accepts the assignment request, then the matching engine 106 assigns the driver to the rider. If the driver rejects the assignment request, then the matching engine 106 selects another driver and sends a subsequent assignment request to the client device 110a for that driver.

In one embodiment, the set of candidate drivers are ranked based on one or more factors and the highest ranked candidate driver is sent the assignment request. In such embodiments, if the highest ranked candidate driver rejects the assignment request, the next highest ranked candidate driver is selected and sent a subsequent assignment request, and so on until a candidate driver accepts the subsequent assignment request.

Map data store 102 stores map information for geographic regions in which the transportation management system 100 offers services such as transportation for riders. The map information includes map data about roads or road segments within the geographic regions. For the purposes of this disclosure, roads can include any route between two places that allows travel by foot, motor vehicle, bicycle, or other suitable form of travel. Examples of roads include streets, highways, freeways, trails, bridges, tunnels, toll roads, or crossings. Roads may be restricted to certain riders, or may be available for public use.

Map data store 102 also stores map properties such as navigation rules for the map data, which can include road properties that describe characteristics of road segments, such as speed limits, road directionality (e.g., one-way or two-way), traffic history, traffic conditions, addresses on the road segment, length of the road segment, and type of the road segment (e.g., surface street, residential, highway, toll). The map properties can also include properties about road intersections, such as turn restrictions, light timing information, traffic throughput, and connecting road segments. In some embodiments, the map properties also include properties describing the geographic region as a whole or portions of the geographic region, such as weather within the geographic region, geopolitical boundaries (e.g., city limits, county borders, state borders, country borders), and topographical properties such as hills and mountains, elevations and slopes thereof, bodies of water, buildings, etc.

Navigation subsystem 108 provides routing guidance from a first location (e.g. rider pickup location) to a second location (next stop location), determines the complexity of a particular navigation route, and selects an appropriate portion of a route to preview to the driver prior to rider pickup at the first location.

Figure 2:
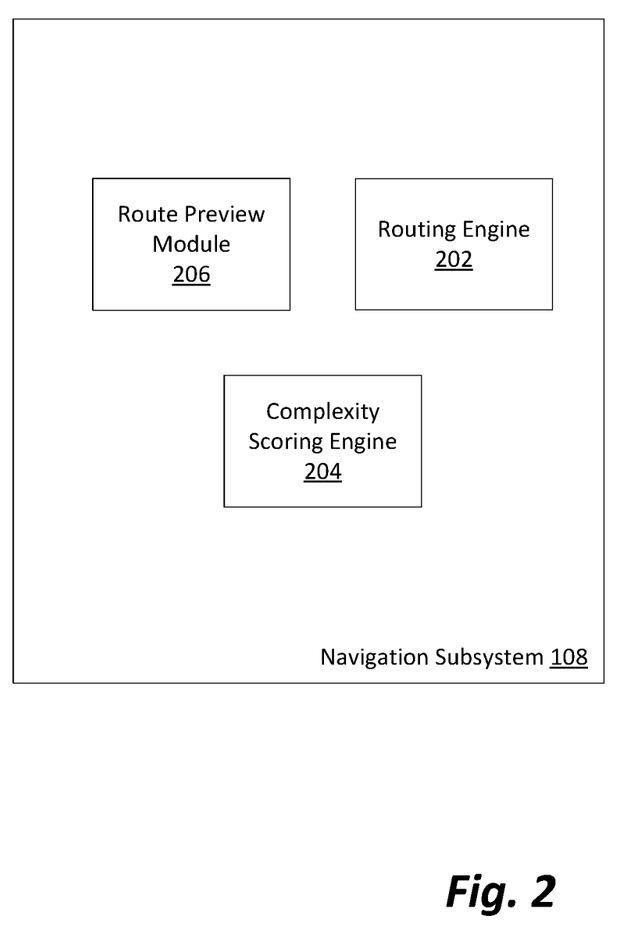
FIG. 2 illustrates a navigation subsystem in accordance with one embodiment.

FIG. 2 illustrates navigation subsystem 108 in further detail in accordance with one embodiment. Navigation subsystem 108 includes a routing engine 202, a complexity scoring engine 204, and a route preview module 206.

Routing engine 202 provides, for a given origin and destination location, and using map data from map data store 102, one or more navigation routes from the origin to the destination. Navigation routes returned by routing engine 202 can be provided to a client 110 of a driver and/or a rider for display in whole or in part in a user interface on the client device. Origin, destination and other map data can be specified in various embodiments using street addresses, point-of-interest (POI) location names, coordinates, or other indicia known by those of skill in the art.

In an embodiment, a navigation route may comprise more than one origin and/or destination locations, depending upon whether or not other riders are picked up after an initial rider is picked up. If other riders are picked up as well, their destinations are added as stops to the navigation route, which may have to be re-determined to account for the new destination locations. In an embodiment, destinations are prioritized in the navigation route based on when the riders were picked up, on a first-in, first-out basis.

In one embodiment, routing engine 202 displays a map of the area around the driver's vehicle and recommends a navigation route. For example, the routing engine 202 may highlight the recommended navigation route on the displayed map of the area by coloring road graphical elements that comprise the representation of the navigation route in a manner distinct from the coloration of other roads graphical elements of the displayed map.

In some embodiments, the routing engine 202 maintains the map at a fixed zoom level, representing an area of constant size. In other embodiments, the routing engine 202 adjusts a zoom level of the map responsive to an initial segment of a navigation route. For example, if the initial segment extends beyond an area of the map at a first zoom level, the routing engine 220 adjusts the map to a second zoom level to fully represent the initial segment. An implementer may set a zoom level limit, which the routing engine 202 will not surpass, limiting how much area may be represented by the map to ensure the graphical elements remain visually comprehensible. In an embodiment, the routing engine 202 adjusts the zoom level of the map only if the initial segment of the navigation route surpasses a threshold complexity score.

Routing engine 202 can also provide written or verbal directions to the driver regarding how to follow the recommended navigation route, for example by displaying instructions in the user interface. In some embodiments, in addition to identifying the recommended navigation route, routing engine 202 also identifies one or more alternate routes. Routing engine 202 may provide user controls to enable the driver to select one of the alternate navigation routes. If so, the user interface adjusts to display the selected alternative navigation route. Selection of alternative navigation routes and other interactions with the transportation management system 100 may be performed using physical and/or on display buttons, voice and/or gesture commands, and/or other interaction forms known by those of skill in the art.

In some embodiments, the map display further includes billboard graphical elements (billboards). A billboard includes one or more text labels that provide written directions for a routing maneuver. Billboards may be placed on the map adjacent to routing maneuvers that exceed a threshold complexity score, which may be selected by the implementer. Billboards may also be placed on the map for routing maneuvers that drivers often miss, or for routing maneuvers that, if not taken, greatly increase trip length. Such routing maneuvers may be associated with billboards by the system 100, for example.

Complexity scoring engine 204 analyzes one or more route segments of a navigation route, and determines a complexity score for the analyzed segments (a route complexity score). A navigation route may be, for example, one of the navigation routes from origin to destination provided by routing engine 202. In one embodiment, the complexity of a route segment increases with the rate of routing maneuvers required along the segment. A routing maneuver may in various embodiments include a turn, roundabout entrance or exit, freeway entrance or exit, or avoidance of a road hazard; or, generally, any required deviation from continuing on a road segment in as close to a forward manner as the road allows. By way of illustration, complexity scoring engine 204 may analyze two route segments—in the first route segment, the navigation route proceeds forward along a road for 1000 meters, turns right, and continues for another 500 meters. In the second route segment, the navigation route proceeds forward for 100 meters, turns left, continues for 300 meters, enters a roundabout, exits the roundabout at the second right turn, continues forward for 400 meters, and enters a freeway via a freeway on-ramp. Complexity scoring engine 204 determines a complexity score for both route segments, scoring the second route segment as more complex than the first route segment.

A scoring algorithm used by complexity scoring engine 204 in one embodiment includes assigning a weight to each type of routing maneuver, and determining the total cost of all maneuvers over the analyzed route segment. The cost may be further adjusted to account for the total length of the route segment being analyzed—this might prevent, for example, a 100 kilometer route with four complex maneuvers from receiving a higher complexity score than a 1 kilometer route with only three complex maneuvers—the latter having fewer absolute maneuvers, but having substantially more complexity per total kilometer driven.

In example embodiments, a scoring algorithm used by complexity scoring engine 204 includes assigning a weight to the maneuver based on real-time or historical traffic conditions. For instance, the scoring engine 204 may increase the complexity of certain maneuvers when the scoring engine 204 estimates, based on real-time and/or historical traffic data, high-volume traffic. Other factors may affect complexity score in various embodiments, such as a speed limit differential between back-to-back maneuvers, weather conditions, construction or other road conditions, amount of daylight, etc.

Route preview module 206 segments a navigation route received from routing engine 202 and obtains complexity scores for one or more of its route segments from complexity scoring engine 204. In particular, in various embodiments route preview module 206 determines whether an initial segment of a driver's navigation route from a rider's pickup location to the driver's next stop has a complexity score higher than a threshold level. If the complexity score is higher than a threshold level, route preview module 206 determines an amount of the navigation route to display on the driver's device, and navigation subsystem 108 provides appropriate instructions for display of that route portion to the driver prior to pickup of the rider.

In one embodiment, a navigation route from a driver's current location to the rider's pickup location is received separately from the initial segment of the driver's navigation route from the rider's pickup location to the driver's next stop, for example, in response to separate network calls. In other embodiments, the navigation route to the rider's pickup location and the initial segment of the driver's navigation route from the rider's pickup location to the driver's next stop are sent together over the network 112, in response to a single network call. This can improve network 112 performance through fewer network calls. Furthermore, the routing engine 202 may determine less complex and/or more accurate driver navigation routes from the rider's pickup location to the driver's next stop responsive to the single network call. For example, this may be obtained by providing a navigation route to the rider's pickup location that ends at a lane of a road where the initial segment of the driver's navigation route from the rider's pickup location to the driver's next stop begins.

In various embodiments, route preview module 206 determines how much of the route to display as follows. First, route preview module 206 obtains a complexity score from complexity scoring engine 204 for an initial segment of the route. In one embodiment, the initial segment is the first 140 meters of the route, though segments of other lengths may be selected by the implementer. Alternatively, if the initial segment were to terminate at a routing maneuver, the length of the initial segment may be increased to include the entirety of the routing maneuver. For example, if the initial segment is 140 meters and the $140^{th}$ meter is halfway into a U-turn, the length may be increased to 160 meters so the initial segment includes the entire U-turn routing maneuver. Furthermore, in an embodiment, if the complexity score of a routing maneuver immediately succeeding a last routing maneuver of the initial segment exceeds a threshold, the initial segment is increased to include the successive routing maneuver.

In one embodiment, if the complexity score for the initial segment is lower than a first threshold, either no route preview is displayed to the driver or, alternatively, a simplified preview is displayed to the driver, simply indicating that the driver should plan to proceed relatively forward after picking up the rider. In one embodiment the first threshold is set such that it will not be reached unless the initial route segment includes a routing maneuver other than forward travel. The first threshold may be raised or lowered according to the needs of the implementer, for example based on the population density and traffic congestion of the geographical area within which the navigation route begins.

Conversely, if the first threshold is met or exceeded, route preview module 206 selects the initial segment to be part of a limited initial route preview provided to the driver. In some embodiments, if the complexity score of the initial segment exceeds a second threshold set higher than the first threshold, route preview module 206 selects a second route segment to display along with the initial segment as part of the limited initial route preview. This recognizes that a particularly high-complexity score for the initial segment indicates that several rapid maneuvers will be required after pickup, and may continue into the second segment, even if the second segment has a lower overall complexity score than the initial segment. In other embodiments there may be additional thresholds which, if exceeded, lead to the display of one or more additional segments.

Figure 3:
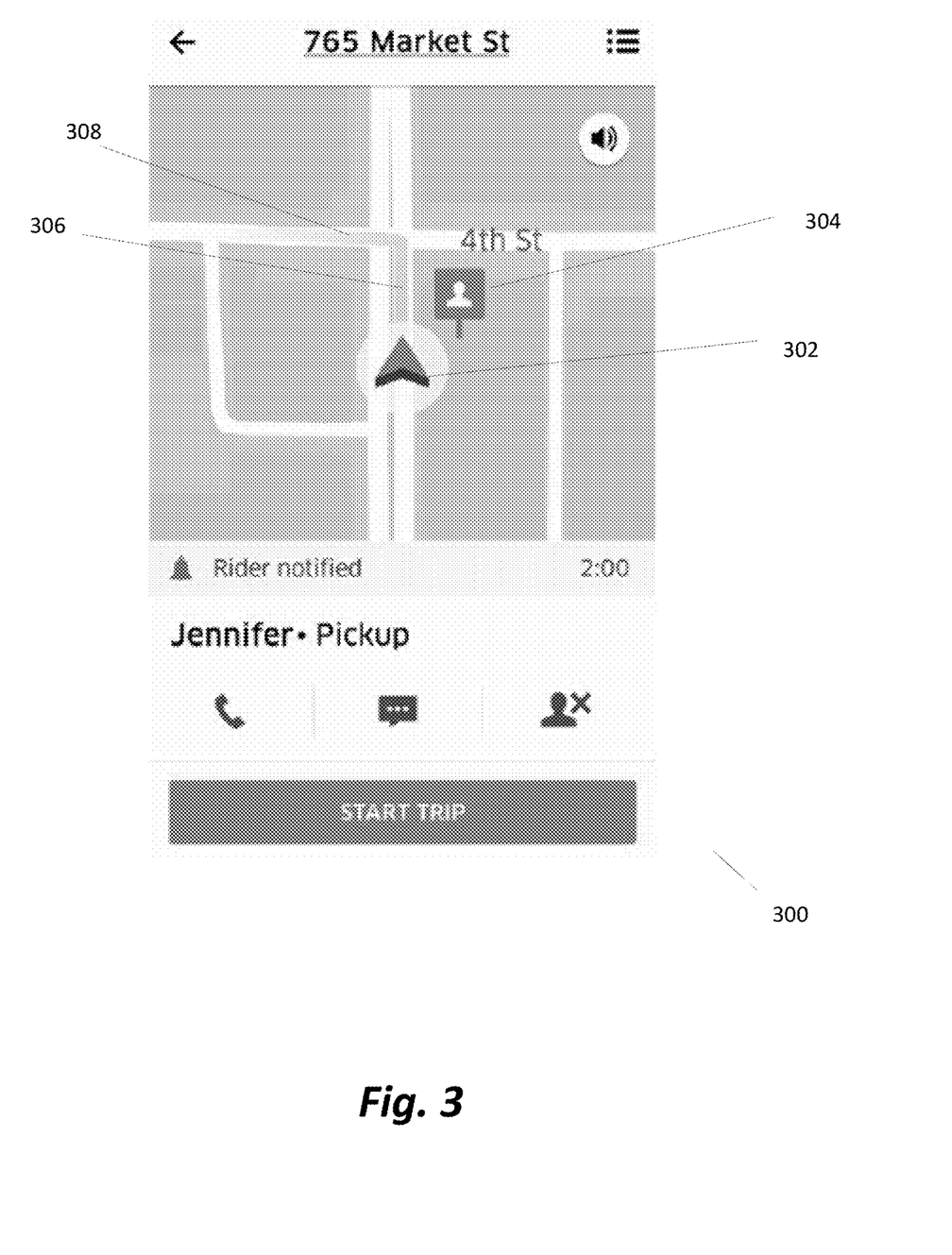
FIG. 3 illustrates an example user interface on a driver device in accordance with one embodiment.

FIG. 3 illustrates an example user interface 300 on a driver device 110a in accordance with one embodiment. In the illustrated case, the driver's position is shown on the map as a pointer 302, and the rider's pickup location is illustrated with a signpost 304. An initial navigation route is shown in this illustration as a highlighted blue route marker that travels forward 306 initially, then turns left onto another street 308. In the illustrated example, the highlighted route fades out after the left turn, to indicate visually to the driver that the remainder of the route exists, but is not yet viewable. Other visual representations of the limited initial route preview may be chosen as desired, for example using shading, animation, and so on.

As seen in FIG. 3, other graphical features may be shown in addition to the navigation route depending upon the embodiment. For example, outlines of buildings or other POIs may be placed among the streets according to their geographical location relative to the streets. Other graphical elements may be displayed as well, such as an address of a building nearest the pickup location, or notifications related to pickup such as a notification that the rider has been alerted to the driver approaching. The user interface 300 can further comprise one or more buttons enabling one or more forms of communication with the rider, for example, telephonic or textual communication. There may also be a button enabling the driver to cancel the pickup, which ends display of the navigation route and alerts the rider that the driver has canceled the pickup. The user interface 300 could further comprise a button to start the trip and change the display to show the entire navigation route, for use by the driver once the rider has been picked up.

In one embodiment, a route from the rider's pickup location to the driver's next stop may be more or less initially complex depending on the direction from which the driver approaches the rider's pickup location. For example, if the rider's pickup location is near an intersection, a pickup that allows the driver to continue straight through the intersection may be much easier for the driver than were the driver to pick up the rider along the cross-street, and thus be facing a perpendicular direction with respect to the navigation route as the rider's trip begins. The latter pickup orientation may lead to an associated series of additional and/or complex routing maneuvers the driver has to execute to successfully navigate to the next stop.

To help optimize both the driver's and rider's experiences, navigation subsystem 108 can guide the driver to the rider's pickup location along a navigation route that causes the driver to approach the rider's pickup location from a direction that leads to the least complex initial route segment following pickup. Thus, in one embodiment, after matching engine 106 pairs a driver with a rider, routing engine 202 uses map data from map data store 102 to compute initial route segment complexities for all valid pickup orientations of the driver's vehicle. Valid pickup orientations include for example, the direction the driver's vehicle faces based on which way the driver approaches the pickup location on a two-way street, or the direction the driver faces when picking up a rider from a corner of an intersection. In one embodiment, navigation subsystem 108 selects as a best pickup orientation the one that leads to the lowest complexity initial segment, and routing engine 202 provides guidance to the driver such that the driver reaches the rider's pickup location in that orientation.

Figure 4:
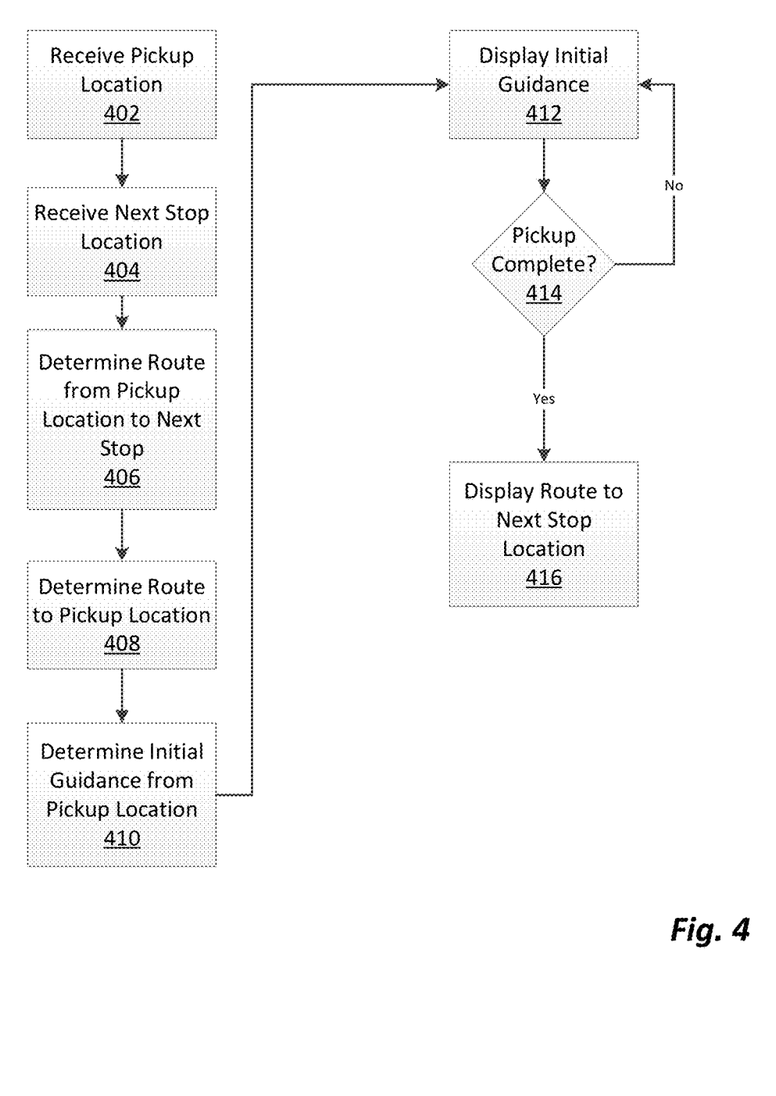
FIG. 4 is a flowchart illustrating a method for providing a limited initial route preview to a driver in accordance with one embodiment.

FIG. 4 is a flowchart illustrating a method for providing a limited initial route preview to a driver in accordance with one embodiment. Initially, transportation management system 100 receives 402 a pickup location, for example as part of a ride request from a rider, and passes this to routing engine 202 of navigation subsystem 108. Routing engine 202 also receives 404 the location of the driver's next stop, which may be the rider's destination, or an intermediate stop along the way, for example to pick up another rider. Next, routing engine 202 determines 406 a route from the rider's pickup location to the driver's next stop. In some embodiments, as described above, navigation subsystem 108 may also determine 408 a route from the driver's current position to the rider's pickup location, and in some embodiments may account for complexity of the initial route segments after pickup when determining 408 the route to the pickup location. Route preview module 206 determines 410 how much of the initial route should be displayed to the driver, as described above, and limited initial route preview information is displayed 412 on the driver's client 110a. Once the rider has been picked up 414, the driver's client 110 is updated to display 416 the full route, including the location of the driver's next stop.

Note that in various embodiments, logic for route guidance and preview may be entirely performed by system 100, or may be performed in conjunction with the driver's device 110a.

Figure 5:
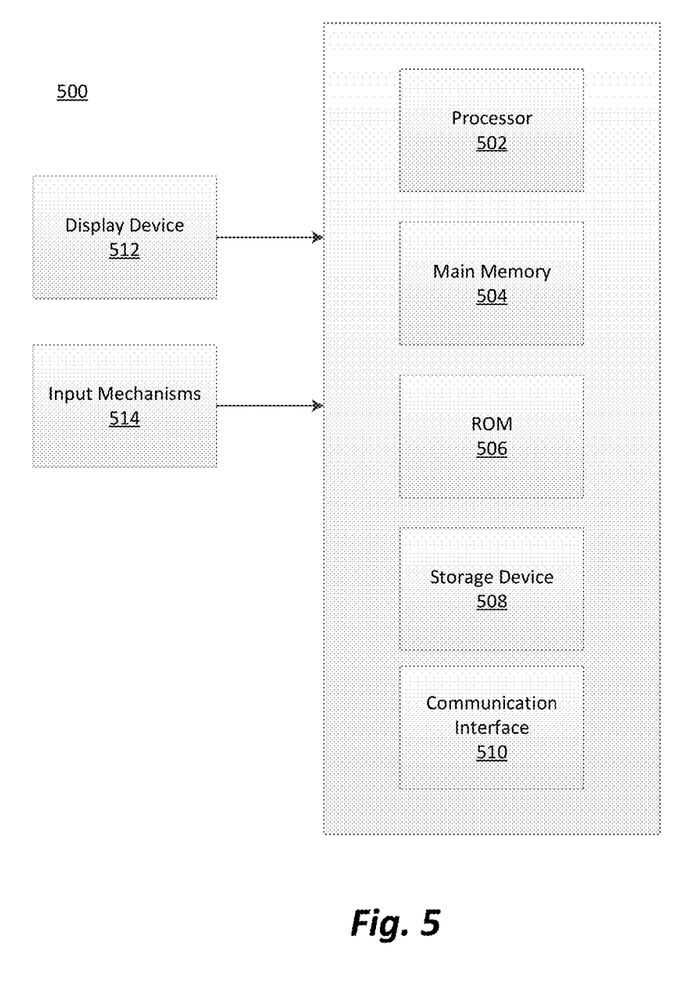
FIG. 5 is a diagram illustrating a computer system upon which embodiments described herein may be implemented.

FIG. 5 is a diagram illustrating a computer system 500 upon which embodiments described herein may be implemented. For example, in the context of FIG. 1, transportation management system 100 may be implemented using a computer system such as described by FIG. 5. Transportation management system 100 may also be implemented using a combination of multiple computer systems as described by FIG. 5, with each computer system implementing one or more of the components of transportation management system 100. Multiple-computer-systems implementations include networked systems, such as a networked client-server system.

In one implementation, transportation management system 100 includes processing resources such as one or more processors 502, as well as main memory 504, read only memory (ROM) 506, a storage device 508, and a communication interface 510. System 100 includes the processor(s) 502 for processing information and main memory 504, such as a random access memory (RAM) or other dynamic storage device, for storing information and instructions to be executed by the processor(s) 502. Main memory 504 also may be used for storing temporary variables or other intermediate information during execution of instructions to be executed by processor(s) 502. Transportation management system 100 may also include ROM 506 or other static storage device for storing static information and instructions for processor(s) 502.

The storage device 508, such as a magnetic disk or optical disk, is provided for storing information and instructions. The communication interface 510 can enable transportation management system 100 to communicate with one or more networks (e.g., cellular network) through use of the network link (wireless or wireline). Using the network link, transportation management system 100 can communicate with one or more computing devices, and one or more servers.

In some variations, transportation management system 100 can be configured to receive sensor data (e.g., such as GPS data) from one or more location tracking devices via the network link. The sensor data can be processed by the processor 502 and can be stored in, for example, the storage device 508. The processor 502 can process the sensor data of a location tracking device in order to determine the path of travel of a transportation vehicle corresponding to the location tracking device. Extrapolated position information can be transmitted to one or more service requestor devices over the network to enable the service applications running on the service requestor devices to use the position information to present a visualization of the actual movement of the transportation vehicles.

Transportation management system 100 can also include a display device 512, such as a cathode ray tube (CRT), an LCD monitor, or a television set, for example, for displaying graphics and information to a user. An input mechanism, such as a keyboard that includes alphanumeric keys and other keys, can be coupled to transportation management system 100 for communicating information and command selections to processor(s) 502. Other non-limiting, illustrative examples of input mechanisms 514 include a mouse, a trackball, touch-sensitive screen, or cursor direction keys for communicating direction information and command selections to processor(s) 502 and for controlling cursor movement on display device 512.

In an example embodiment, storage device 508 stores user data store 104, map data store 102, navigation subsystem 108, and the matching engine 106 components of FIG. 1 as computer executable instructions. During operation, the processor(s) 502 executes the instructions and loads the components into main memory 504. The instructions cause the processor(s) 502 to perform the method of FIG. 4. In this way, the processor(s) 502 coupled to main memory 504, read only memory (ROM) 506, storage device 508, and communication interface 510 (as described below in greater detail) is a special-purpose processor.

Examples described herein are related to the use of transportation management system 100 for implementing the techniques described herein. According to one embodiment, those techniques are performed by transportation management system 100 in response to processor(s) 502 executing one or more sequences of one or more instructions contained in main memory 504. Such instructions may be read into main memory 504 from another machine-readable medium, such as storage device 508. Execution of the sequences of instructions contained in main memory 504 causes processor(s) 502 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
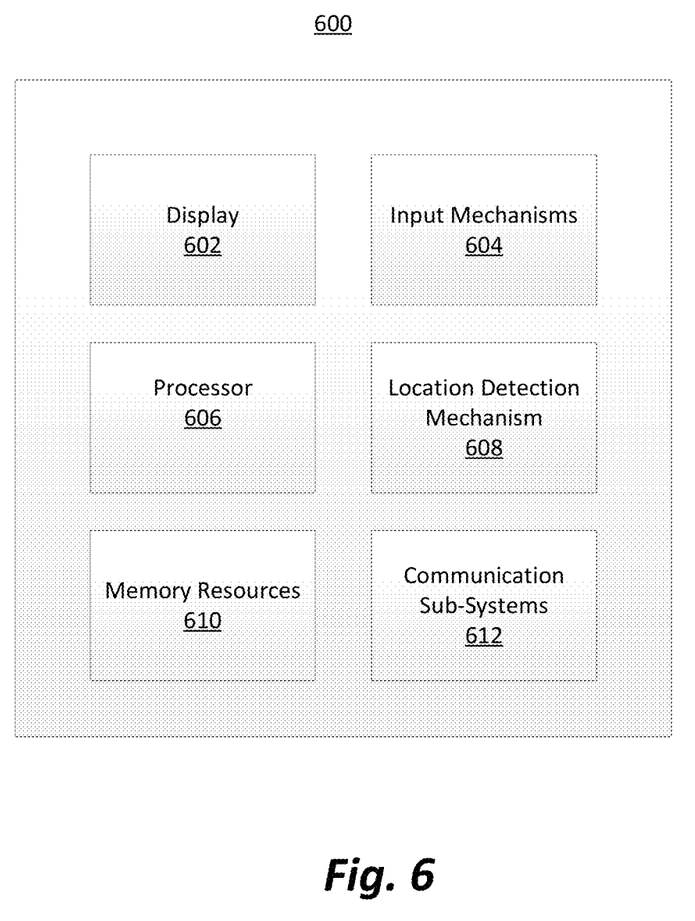
FIG. 6 is a diagram illustrating a mobile computing device upon which embodiments described herein may be implemented.

FIG. 6 is a diagram illustrating a mobile computing device upon which embodiments described herein may be implemented as described above, for example with respect to a rider device or driver device. In one embodiment, a computing device 600 may correspond to a mobile computing device, such as a cellular device that is capable of telephony, messaging, and data services. Examples of such devices include smartphones, handsets or tablet devices for cellular carriers. Computing device 600 includes a processor 606, memory resources 610, a display device 602 (e.g., such as a touch-sensitive display device), one or more communication sub-systems 612 (including wireless communication sub-systems), input mechanisms 604 (e.g., an input mechanism can include or be part of the touch-sensitive display device), and one or more location detection mechanisms (e.g., GPS module) 608. In one example, at least one of the communication sub-systems 612 sends and receives cellular data over data channels and voice channels.

The processor 606 is configured with software and/or other logic to perform one or more processes, steps and other functions described with implementations, such as those described herein. Processor 606 is configured, with instructions and data stored in the memory resources 610, to operate a service application as described herein. For example, instructions for operating the service application in order to display user interfaces can be stored in the memory resources 610 of the computing device 600.

The processor 606 can provide content to the display 602 by executing instructions and/or applications that are stored in the memory resources 610. In some examples, one or more user interfaces can be provided by the processor 606, such as a user interface for the service application, based at least in part on the received position information of the one or more transportation vehicles. While FIG. 6 is illustrated for a mobile computing device, one or more embodiments may be implemented on other types of devices, including full-functional computers, such as laptops and desktops (e.g., PC).

In addition to the embodiments specifically described above, those of skill in the art will appreciate that the invention may additionally be practiced in other embodiments.

Within this written description, the particular naming of the components, capitalization of terms, the attributes, data structures, or any other programming or structural aspect is not mandatory or significant unless otherwise noted, and the mechanisms that implement the described invention or its features may have different names, formats, or protocols. Further, the system may be implemented via a combination of hardware and software, as described, or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required. It should be noted that the process steps and instructions of the present invention could be embodied in software, firmware or hardware, and when embodied in software, could be downloaded to reside on and be operated from different platforms used by real time network operating systems.

Algorithmic descriptions and representations included in this description are understood to be implemented by computer programs. Furthermore, it has also proven convenient at times, to refer to these arrangements of operations as modules or code devices, without loss of generality.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented are not inherently related to any particular computer or other apparatus. Various general-purpose systems may also be used with programs in accordance with the teachings above, or it may prove convenient to construct more specialized apparatus to perform the required method steps. The required structure for a variety of these systems will appear from the description above. In addition, a variety of programming languages may be used to implement the teachings above.

Finally, it should be noted that the language used in the specification Has Bean principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for providing route guidance to a driver of a vehicle, the method comprising: receiving, by at least one processor at a transportation management system, an origin location and a destination location; determining, by the transportation management system, a vehicle navigation route from the origin location to the destination location; determining, by the transportation management system, for at least an initial segment of the vehicle navigation route, a route complexity score, wherein the route complexity score represents a complexity of route maneuvers in the initial segment of the vehicle navigation route; responsive to the determined route complexity score exceeding a first threshold complexity score, instructing a driver's mobile computing device to display the initial segment of the vehicle navigation route prior to reaching the origin location; and instructing the driver's mobile computing device to display the destination location subsequent to reaching the origin location.

2. The computer-implemented method of claim 1, wherein a routing maneuver includes at least one of a turn, a roundabout entrance, or a freeway entrance.

3. The computer-implemented method of claim 1, wherein a routing maneuver includes a required deviation from continuing on a road segment in as close to a forward manner as the road segment allows.

4. The computer-implemented method of claim 1 further comprising: responsive to the route complexity score exceeding a second threshold complexity score higher than the first threshold complexity score, instructing the driver's mobile computing device to display both the initial segment and a next segment of the vehicle navigation route prior to reaching the origin location.

5. The computer-implemented method of claim 1, wherein determining the route complexity score further comprises: assigning each of the route maneuvers a weight; combining the assigned weights to produce a total maneuver cost; and adjusting the total maneuver cost based on at least one of a length of the initial segment, a weather condition factor, a speed limit differential, a daylight factor, and a historic level of traffic of the initial segment.

6. A computer program product for providing route guidance to a driver of a vehicle, the computer program product stored on a non-transitory computer-readable storage medium and including instructions configured to cause a processor to execute steps comprising: receiving, by at least one processor at a transportation management system, an origin location and a destination location; determining, by the transportation management system, a vehicle navigation route from the origin location to the destination location; determining, by the transportation management system, for at least an initial segment of the vehicle navigation route, a route complexity score, wherein the route complexity score represents a complexity of route maneuvers in the initial segment of the vehicle navigation route; responsive to the determined route complexity score exceeding a first threshold complexity score, instructing a driver's mobile computing device to display the initial segment of the navigation route prior to reaching the origin location; and instructing the driver's mobile computing device to display the destination location subsequent to reaching the origin location.

7. The computer program product of claim 6, wherein a routing maneuver includes at least one of a turn, a roundabout entrance, or a freeway entrance.

8. The computer program product of claim 6, wherein a routing maneuver includes a required deviation from continuing on a road segment in as close to a forward manner as the road segment allows.

9. The computer program product of claim 6 further comprising: responsive to the route complexity score exceeding a second threshold complexity score higher than the first threshold complexity score, instructing the driver's mobile computing device to display both the initial segment and a next segment of the vehicle navigation route prior to reaching the origin location.

10. The computer program product of claim 6, wherein determining the route complexity score further comprises: assigning each of the route maneuvers a weight; combining the assigned weights to produce a total maneuver cost; and adjusting the total maneuver cost based on at least one of a length of the initial segment, a weather condition factor, a speed limit differential, a daylight factor, and a historic level of traffic of the initial segment.

11. A computer-implemented method for providing route guidance to a driver of a vehicle, the method comprising: receiving, by at least one processor at a transportation management system, a rider pickup location and a next stop location; determining, by the transportation management system, a plurality of routes from the rider pickup location to the next stop location, each of the determined routes having a different orientation of a driver's vehicle at the rider pickup location; determining, by the transportation management system, for at least an initial segment of each of the plurality of routes, a route complexity score, wherein the route complexity score represents a complexity of route maneuvers in the initial segment of the route; selecting as a best route, by the transportation management system, one of the plurality of routes having a lowest route complexity score; providing, by the transportation management system to a mobile computing device of the driver, navigation guidance from a current location of the driver to the rider pickup location, the provided guidance including routing instructions that will cause the driver's vehicle to arrive at the rider pickup location in the orientation associated with the selected best route; responsive to the determined route complexity score for the selected best route exceeding a first threshold complexity score, instructing the driver's mobile computing device to display the initial segment of the selected best route prior to reaching the rider pickup location; and instructing the driver's mobile computing device to display the next stop location subsequent to reaching the rider pickup location.

12. The computer-implemented method of claim 11, wherein the routing maneuvers include at least one of a turn, a roundabout entrance, or a freeway entrance.

13. The computer-implemented method of claim 11, wherein the routing maneuvers include a required deviation from continuing on a road segment in as close to a forward manner as the road segment allows.

14. The computer-implemented method of claim 11 further comprising: responsive to the route complexity score exceeding a second threshold complexity score higher than the first threshold complexity score, instructing the driver's mobile computing device to display both the initial segment and a next segment of the navigation route prior to reaching the rider pickup location.

15. The computer-implemented method of claim 11, wherein determining at least one route complexity score further comprises: assigning each of the route maneuvers of the initial segment a weight; combining the assigned weights to produce a total maneuver cost; and adjusting the total maneuver cost based on at least one of a length of the initial segment, a weather condition factor, a speed limit differential, a daylight factor, and a historic level of traffic of the initial segment.

16. A computer program product for providing route guidance to a driver of a vehicle, the computer program product stored on a non-transitory computer-readable storage medium and including instructions configured to cause a processor to execute steps comprising: receiving, by at least one processor at a transportation management system, a rider pickup location and a next stop location; determining, by the transportation management system, a plurality of routes from the rider pickup location to the next stop location, each of the determined routes having a different orientation of a driver's vehicle at the rider pickup location; determining, by the transportation management system, for at least an initial segment of each of the plurality of routes, a route complexity score, wherein the route complexity score represents a complexity of route maneuvers in the initial segment of the route; selecting as a best route, by the transportation management system, one of the plurality of routes having a lowest route complexity score; providing, by the transportation management system to a mobile computing device of the driver, navigation guidance from a current location of the driver to the rider pickup location, the provided guidance including routing instructions that will cause the driver's vehicle to arrive at the rider pickup location in the orientation associated with the selected best route; responsive to the determined route complexity score for the selected best route exceeding a first threshold complexity score, instructing the driver's mobile computing device to display the initial segment of the selected best route prior to reaching the rider pickup location; and instructing the driver's mobile computing device to display the next stop location subsequent to reaching the rider pickup location.

17. The computer program product of claim 16, wherein a routing maneuver includes at least one of a turn, a roundabout entrance, or a freeway entrance.

18. The computer program product of claim 16, wherein a routing maneuver includes a required deviation from continuing on a road segment in as close to a forward manner as the road segment allows.

19. The computer program product of claim 16, further comprising: responsive to the route complexity score exceeding a second threshold complexity score higher than the first threshold complexity score, instructing the driver's mobile computing device to display both the initial segment and a next segment of the vehicle navigation route prior to reaching the rider pickup location.

20. The computer program product of claim 16, wherein determining at least one route complexity score further comprises: assigning each of the route maneuvers of the initial segment a weight; combining the assigned weights to produce a total maneuver cost; and adjusting the total maneuver cost based on at least one of a length of the initial segment, a weather condition factor, a speed limit differential, a daylight factor, and a historic level of traffic of the initial segment.

* * * * *